United States Patent
Horn et al.

(10) Patent No.: US 7,162,579 B2
(45) Date of Patent: Jan. 9, 2007

(54) ASYMMETRICAL LOAD BALANCING FOR MIRRORED STORAGE VOLUMES

(75) Inventors: Robert L. Horn, Yorba Linda, CA (US); Virgil V. Wilkins, Perris, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 246 days.

(21) Appl. No.: 10/637,533

(22) Filed: Aug. 11, 2003

(65) Prior Publication Data

US 2004/0034751 A1 Feb. 19, 2004

Related U.S. Application Data

(60) Provisional application No. 60/404,149, filed on Aug. 19, 2002.

(51) Int. Cl.
*G06F 12/02* (2006.01)
(52) U.S. Cl. .................................... 711/114; 718/105
(58) Field of Classification Search ................ None
See application file for complete search history.

(56) References Cited

U.S. PATENT DOCUMENTS

| 5,636,359 | A | | 6/1997 | Beardsley et al. | 711/122 |
|---|---|---|---|---|---|
| 5,657,468 | A | | 8/1997 | Stallmo et al. | 711/114 |
| 5,937,428 | A | * | 8/1999 | Jantz | 711/114 |
| 5,974,503 | A | | 10/1999 | Venkatesh et al. | 711/114 |
| 6,052,759 | A | | 4/2000 | Stallmo et al. | 711/114 |
| 6,151,641 | A | | 11/2000 | Herbert | 710/22 |
| 6,189,071 | B1 | * | 2/2001 | Bachmat | 711/114 |
| 6,415,373 | B1 | | 7/2002 | Peters et al. | 711/167 |
| 6,438,652 | B1 | * | 8/2002 | Jordan et al. | 711/120 |
| 6,763,438 | B1 | * | 7/2004 | Ogawa et al. | 711/157 |
| 6,766,416 | B1 | * | 7/2004 | Bachmat | 711/114 |

* cited by examiner

*Primary Examiner*—Denise Tran
(74) *Attorney, Agent, or Firm*—Dickstein Shapiro LLP

(57) ABSTRACT

A network storage system includes a network storage system controller/virtualizer which includes at least one transaction processor. When a host access request is received by the network storage system controller/virtualizer, the transaction processor calculates one or more cost functions. In one exemplary embodiment, a cost function associated with storage system volume load and a cost function associated with communication path load are calculated. The cost function result(s) are utilized by the storage system controller/virtualizer to form a request for servicing the host access request while balancing the load of the network storage system.

20 Claims, 3 Drawing Sheets

ASYMMETRICAL LOAD BALANCING FOR MIRRORED STORAGE VOLUMES

This application claims benefit of U.S. Provisional Application Ser. No. 60/404,149, filed Aug. 19, 2002, the disclosure of which is herein incorporated by reference in its entirety.

CROSS REFERENCE TO RELATED APPLICATIONS

This application is related to Ser. No. 10/429,048, entitled "SCALABLE TRANSACTION PROCESSING PIPELINE," filed May 5, 2003, now U.S. Pat. No. 7,028,297, which is a continuation-in-part of application Ser. No. 09/739,354, filed Dec. 15, 2000, now abandoned. This application is also related to application Ser. No. 09/716,195, entitled "INTEGRATED INPUT/OUTPUT CONTROLLER," filed Nov. 17, 2000, now abandoned, and application Ser. No. 10/294,562, entitled "METHOD OF FLEXIBLY MAPPING A NUMBER OF STORAGE ELEMENTS INTO A VIRTUAL STORAGE ELEMENT," filed Nov. 15, 2002, now U.S. Pat. No. 6,912,643. The disclosures of each of these applications are hereby incorporated by reference.

FIELD OF INVENTION

The present invention relates to a load balancing networked storage system which optimizes storage volume and communication channel utilization.

BACKGROUND OF THE INVENTION

With the accelerating growth of both Internet and intranet communication, high bandwidth applications (such as streaming video), and large information databases, the need for networked storage systems has increased dramatically. Of particular concern is the performance level of networked storage, especially in high utilization use models.

In conventional architectures, computer data is mirrored or striped across the available storage volume resources, and the networked storage system controller/virtualizer maintains the indexing or addressing information necessary to maintain the data integrity, data synchronization, and read and write data across the mirrored or striped storage volumes. Conventional networked storage system architectures focus on providing enough data protection to ensure that networks can suffer high levels of storage volume degradation without loss of data. However, one of the limitations to this configuration is the necessity of trading-off cost and performance. While networked storage system architectures protect storage volume integrity, they do not necessarily provide any performance optimization methods for storage volume and communication channel utilization. This means that when the networked storage system controller/virtualizer receives commands, little or no consideration is given to efficient and speedy routing and retrieval of the data based on load balancing.

Occasional slowness of processes and the inconvenience of storage volume replacement have become accepted as the costs of having the data protection provided by high reliability networked storage system configurations. More specifically, networked storage system configurations are only as fast as their internal communications and the efficiency of their reading, writing, and routing of mirrored and striped data. It has long been accepted that decreased speed and efficiency are the prices for the safety net provided by networked storage system configuration. In a conventional networked storage system architecture there are several storage volumes connected with several communication channel options, such as FibreChannel Arbitrated Paths. When a request or command for data is executed, there is generally no sensitivity to the overall bandwidth loads of the communication channels.

Some commercially available networked storage system architectures provide load balancing by using some awareness of the number of commands or functions being performed or maintained per storage volume. However, such features are typically implemented using a counting function that does fully appreciate differing sizes of commands and requests that might skew the load balance even if the count were identical. There is a need for a networked storage system configuration capable of providing the same level of data protection of conventional networked storage system configurations while providing load-balancing services for increased performance.

SUMMARY OF THE INVENTION

The present invention is an apparatus and method for per-command, asymmetrical load balancing in a networked storage system that includes several storage volumes and a networked storage system controller/virtualizer. The networked storage system controller/virtualizer further includes a first transaction processor and, optionally, a second transaction processor. In one networked storage system controller/virtualizer implementation, the transaction processors may use one of a plurality of available paths to communicate to a number of storage volumes in the storage system. The networked storage system controller/virtualizer acquires real-time knowledge of the path and storage volume workload The hardware-accelerated transaction processor performs a cost function calculation in real-time on a per-command basis in order to continually determine the optimal storage volume to access and optimum path routing. The cost function is calculated considering the number of outstanding commands, the number of pending commands, and the size of commands, in order to continually balance the load of command traffic across the storage system.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
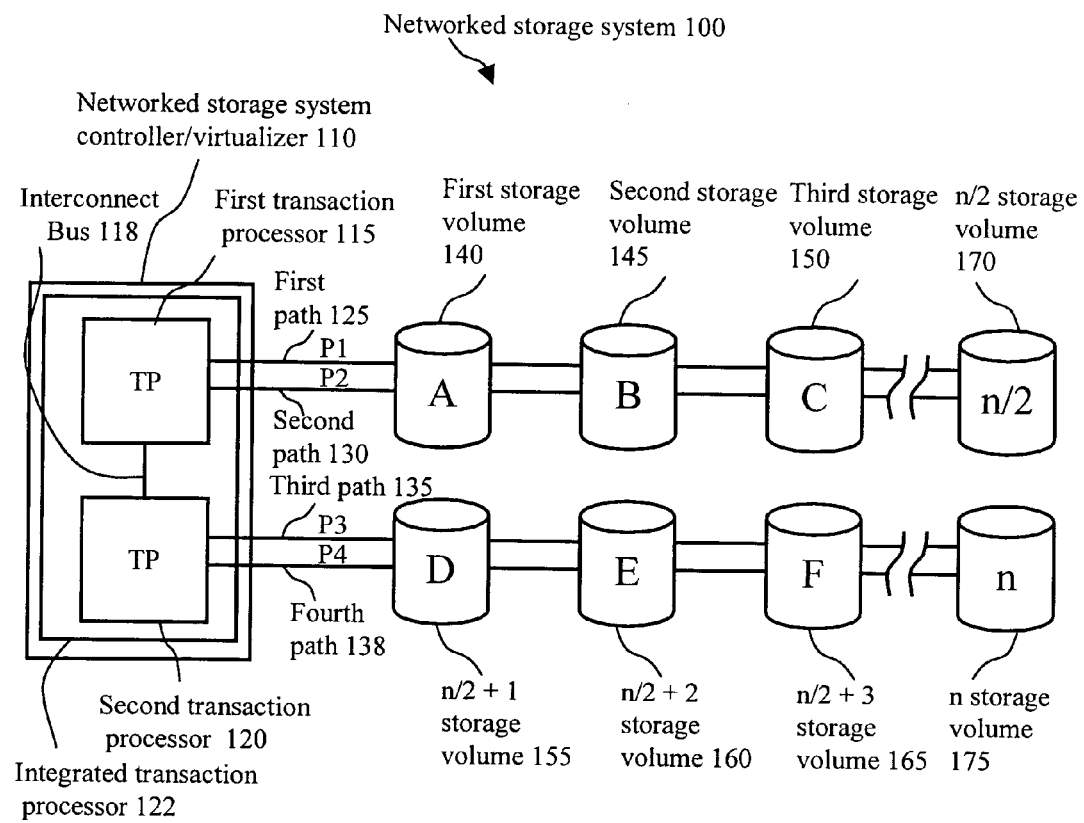
FIG. 1 is a block diagram of a network storage system.

Now referring to the drawings, where like reference numerals designate like elements, there is shown in FIG. 1 a networked storage system 100, including a networked storage system controller/virtualizer 110, a first path 125, a second path 130, a third path 135, a fourth path 138, a first storage volume 140, a second storage volume 145, a third storage volume 150, an n/2+1 storage volume 155, an n/2+2 storage volume 160, an n/2+3 storage volume 165, an n/2 storage volume 170, and an n storage volume 175. Networked storage system 100 is one possible implementation of a networked storage system controller/virtualizer; however, it should be understood that many similar transaction processor based topologies could support the described invention.

Networked storage system controller/virtualizer 110 is further comprised of an integrated transaction processor 122. Integrated transaction processor 122 is further comprised of a first transaction processor 115, an interconnect bus 118, and a second transaction processor 120.

In one exemplary embodiment, the networked storage system controller/virtualizer 110 comprises a conventional printed circuit card assembly, on which are mounted the first transaction processor 115 and the second transaction processor 120. Each transaction processor 115, 230 may be a semiconductor chip or a chip set which comprise Application Specific Integrated Circuits (ASICs), processors, and memory. Each transaction processor 115, 230 may comprise memory and communications systems which provide high-speed connectivity between the SAN (storage area network) fabric and storage volume storage array. First transaction processor 115 and second transaction processor 120 communicate electrically via interconnect bus 118. First transaction processor 115 is electrically connected to all the storage volumes in first path 125 and second path 130, including first storage volume 140, second storage volume 145, third storage volume 150, through n/2 storage volume 170 (where "n" represents the total number of storage volumes in the storage system). In a similar way, second transaction processor 120 is electrically connected to all the storage volumes in third path 135 and fourth path 138, including n/2+1 storage volume 155, n/2+2 storage volume 160, n/2+3 storage volume 165, through n storage volume 175. All paths are dedicated data communications means, such as FibreChannel Arbitrated Paths (FC-AL), i.e., storage volume data communication interfaces known in conventional networked storage system technology. First transaction processor 115, second transaction processor 120 and interconnect bus 118 form integrated transaction processor 122.

Figure 2:
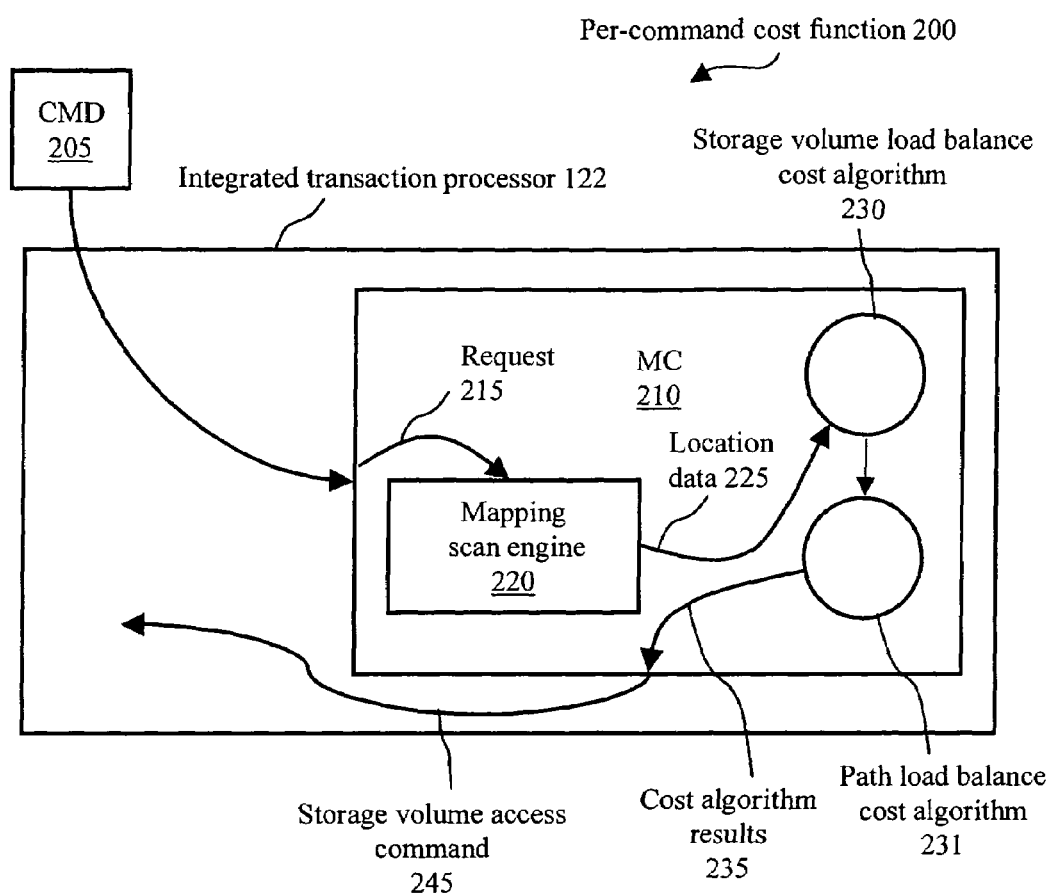
FIG. 2 is a block diagram of a per-command cost function.

FIG. 2 illustrates a per-command cost function 200, including integrated transaction processor 122, a command (CMD) 205, a mapping controller (MC) 210, a request 215, a mapping scan engine 220, location data 225, cost algorithms 230, 231, cost algorithm results 235, and data on calculated route 245.

CMD 205 is a user request that is entered into integrated transaction processor 122 by way of user-generated code. Integrated transaction processor 122 identifies CMD 205 as appropriate for the processing by MC 210. Integrated transaction processor 122 contains a plurality of compute elements designed to execute specific functions, MC 210 being one such element. MC 210 is a functional element within integrated transaction processor 122 that ensures that CMD 205 is in allowable volume and logical block address range, performs mapping descriptor searches, and builds the appropriate storage volume commands to execute CMD 205. MC 210 may send CMD 205 on to one or more internal mapping scan engines 220 as request 215. Mapping scan engine 220 is a dedicated search engine peripheral within MC 210 that maintains indices for the location of all of the data contained in the storage system. Request 215 is formulated as a configuration command set for mapping scan engine 220 to determine a Mapping Descriptor (MD). Mapping scan engine 220 searches one or more queues or table structures and determines the location of the data in terms of its mapping descriptor.

The storage volume load balance cost algorithm 230 is a code segment executed in MC 210 that determines the storage volume cost based on many factors, including the number of commands that are being processed per storage volume, the weight or size of each command, how many sectors have been requested for each storage volume, the current drive workload, the stripe size for each mapping, and the status of the mapping. Weighting factors are programmable on a per volume basis. Cost algorithm 230 determines the appropriate storage volume(s) to access to process CMD 205 while maintaining the desired storage volume and path workload balance. Storage volume load balance cost algorithm 230 is performed on read command requests only.

The path load balance cost algorithm 231 then determines the path cost based on several factors, including the number of commands per path, the weight or size of each command, and the number of sectors per path. Weighting factors are programmable on a per volume basis. Cost algorithm 230 determines the appropriate path to use to process CMD 205 while maintaining the desired storage volume and path workload balance. Path load balance cost algorithm 231 is performed on both read and write command requests.

Storage volume load balance cost algorithm 230 and path load balance cost algorithm 231 then return cost algorithm results 235. MC 210 then uses results 235 to determine the storage volume access commands required to service CMD 205. The results are then sent as storage volume access command 245 for use by other functional blocks of integrated transaction processor 122 in continued execution of CMD 205.

In operation, networked storage system controller/virtualizer 110 performs all of the conventional networked storage system management functions and supports multiple networked storage system levels. In addition, networked storage system controller/virtualizer 110 uses integrated transaction processor 122 to handle load balancing using cost functions applied to storage volume usage and path usage. Integrated transaction processor 122 further applies dynamic storage volume mapping in order to make possible the insertion of dissimilar storage volumes and the usage of degraded storage volumes in the storage system. First path 125, second path 130, third path 135, and fourth path 138 are data communication means, such as FC-AL. FC-AL is one of the three basic FibreChannel topologies: fabric, point-to-point, and arbitrated loop. First storage volume 140, second storage volume 145, third storage volume 150, n/2 storage volume 170, n/2+1 storage volume 155, n/2+2 storage volume 160, n/2+3 storage volume 165, and n storage volume 175 are conventional storage volumes that may be identical or dissimilar, depending on the particular networked storage system architecture of the particular instantiation of the present invention.

Figure 3:
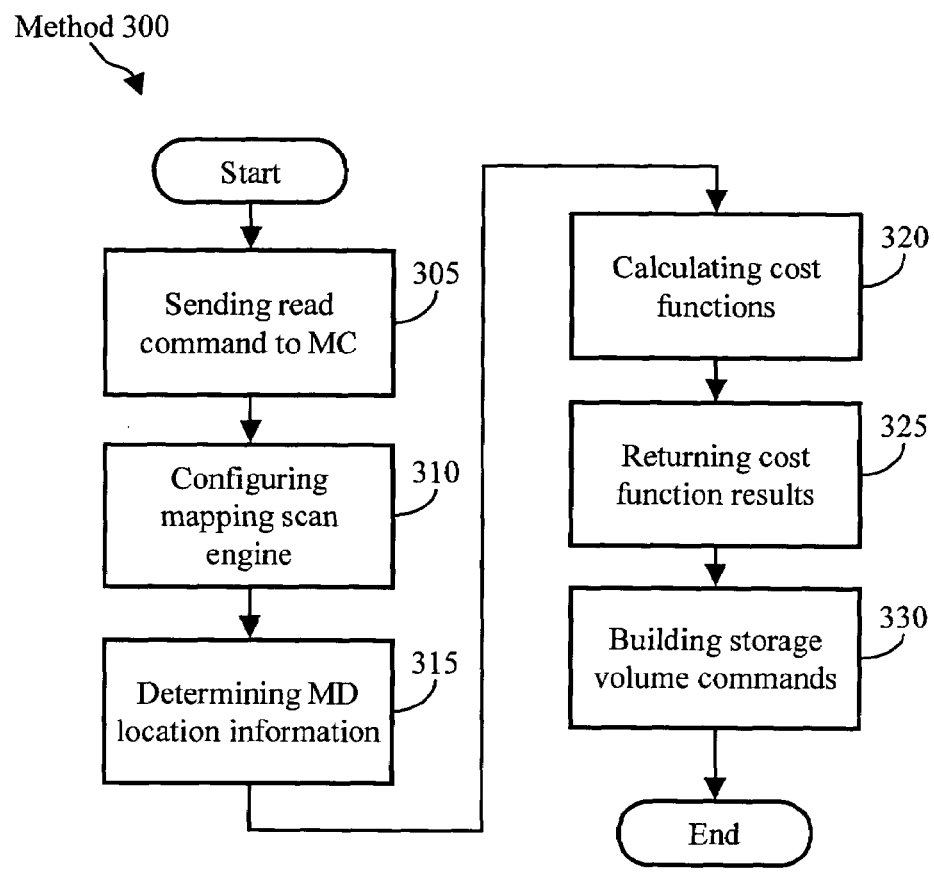
FIG. 3 is a flow chart illustrating an application of the per-command cost function in a network storage system.

FIG. 3 illustrates a method 300 of applying a per-command cost function in a networked storage system. The method 300 is specific to a read command, which includes both storage volume and path load balancing. The method includes the steps of:

Step 305: Sending read CMD to MC

In this step, a host sends a request in the form of CMD 205 to integrated transaction processor 122 and directly into MC 210. MC 210 reformulates the request if necessary to ensure that it specifies a proper volume and logical block address range.

Step 310: Configuring Mapping Scan Engine

In this step, MC 210 formulates and sends an MD search engine configuration in the form of request 215 internally to mapping scan engine 220.

Step 315: Determining MD Location Information

In this step, Mapping scan engine 220 determines the location of the data in terms of its MD location, or Mapping descriptor location.

Step 320: Calculating Cost Functions

In this step, storage volume load balance cost algorithm 230 the storage volume cost based on many factors including the number of commands that are being processed per storage volume, the weight or size of each command, how many sectors there are for each storage volume, the stripe size for each storage volume, the status of the storage volume, and whether the storage volume has any bad sectors. The calculation may look as follows in pseudo code:

$MDCost=$
(CommandsPerVolume*Volume$CmdW$eight)+
(SectorsPerVolume*VolumeSectorWeight)+
(StripeSize*StripeSizeWeight)+
(BadVolumeStatus*BadVolumeWeight)

Path load balance cost algorithm 231 then determines the path cost based on several factors including number of commands per path, the weight or size of each command, and the number of sectors per path. The calculation may look as follows in pseudo code:

PathCost=(CommandsPerPath*Path$CmdW$eight)+
(SectorsPerPath*PathSectorWeight)

Step 325: Returning Cost Function Results

In this step, the results of storage volume load balance cost algorithm 230 and path load balance cost algorithm 231 are returned to other functional blocks (not shown) of MC 210 as cost algorithm results 235.

Step 330: Building Storage Volume Access Commands

In this step, MC 210 builds a set of storage volume access commands using cost algorithm results 235 to service CMD 205. This set of commands is sent as storage volume access command 245 to other functional blocks of integrated transaction processor 122 (not shown) for continued execution of CMD 205. The method ends after step 330.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A method for reading data from a networked storage system, comprising:
receiving, from a host, a host access command for reading data;
determining a plurality of storage volumes having the data;
calculating at least one cost function for each of said plurality of storage volumes, said at least one cost function being calculated using a plurality of weighting factors, each of said plurality of weighting factors being individually programmable for each of said plurality of storage volumes;
building a storage access command for optimizing reading of one of said plurality of storage volumes having the data based on a set of results of said at least one cost function;
accessing one of said plurality of storage volumes having the data by processing the storage access command; and
returning said data to the host to service the host access command.

2. The method of claim 1, wherein said at least one cost function comprises a cost function based on storage volume load.

3. The method of claim 2, wherein said storage access command was built directed to a storage volume having the data and having minimal loading.

4. The method of claim 2, wherein said storage volume load is calculated as a weighted function based upon at least a number of commands pending on a storage volume.

5. The method of claim 2, wherein said storage volume load is calculated as a weighted function based upon at least a number of sectors per volume.

6. The method of claim 2, wherein said storage volume load is calculated as a weighted function based upon at least a stripe size of said storage volume.

7. The method of claim 2, wherein said storage volume load is calculated as a weighted function based on at least a number of bad sectors on a storage volume.

8. The method of claim 1, wherein said at least one cost function comprises a cost function based upon communication path load.

9. The method of claim 8, wherein said storage access command was built directed to using a network path having minimal loading.

10. The method of claim 8, wherein said communication path load is calculated as a weighted function based upon at least a number of commands pending on a network path.

11. The method of claim 8, wherein said communication path load is calculated as a weighted function based upon at least a number of sectors per path.

12. A network storage system, comprising:
a plurality of network paths;
a plurality of storage volumes, each of said storage volumes being coupled to at least two network paths;
a controller coupled to each of said plurality of network paths;
wherein when said controller receives a host read command, said controller:
determines a set of volumes containing a copy of data requested by said host read command;
calculates at least one cost function associated with each copy of said data, said at least one cost function being calculated using a plurality of weighting factors, each of said plurality of weighting factors being individually programmable for each of said set of volumes;
builds an access command to a copy of said data based on a results of said at least one cost function; and
retrieves a copy of said data by executing said access command to service said host read command.

13. The network storage system of claim 12, wherein said controller comprises at least one transaction processor.

14. The network storage system of claim 13, wherein said controller comprise two transaction processors.

15. The network storage system of claim 14, wherein one of said two transaction processors calculates a first cost function based upon storage volume load.

16. The network storage system of claim 14, wherein another one of said two transaction processors calculates a second cost function based upon communication path load.

17. The network storage system of claim 13, wherein each one of said transaction processors comprise a map scan engine for determining each location of said read data.

18. The network storage system of claim 13, wherein each one of said transaction processors include a means for determining a storage volume load.

19. The network storage system of claim 13, wherein each one of said transaction processors include a means for determining a communications load.

20. The network storage system of claim 13, wherein each one of said transaction processors include a means for building an access command based on results from said cost functions.

* * * * *